April 15, 1924.

H. S. STEPHENS

AMUSEMENT BOOK

Filed Dec. 7, 1922

INVENTOR
Harry S. Stephens
BY
Meyers, Cavanagh & Whitehead
ATTORNEYS

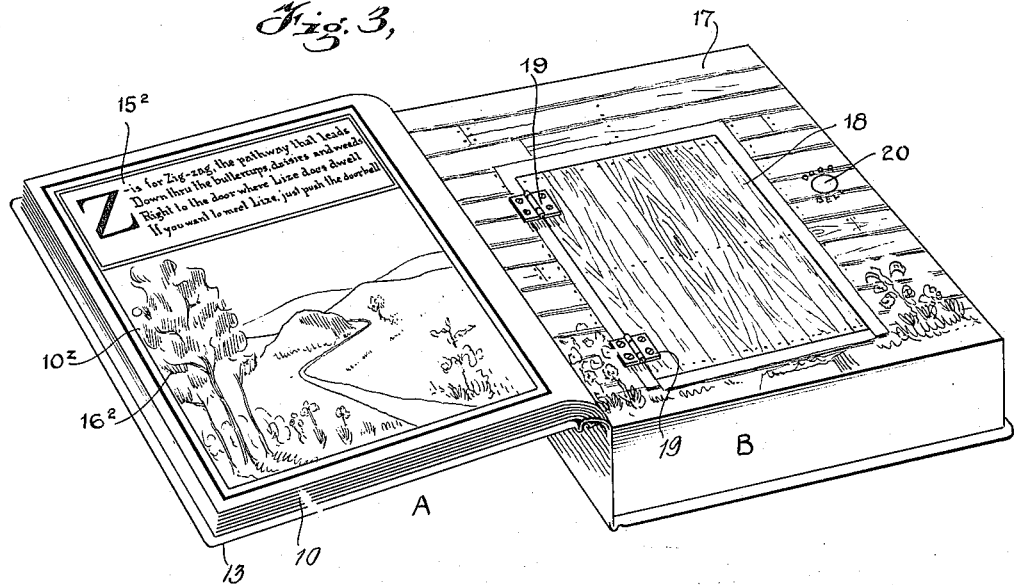
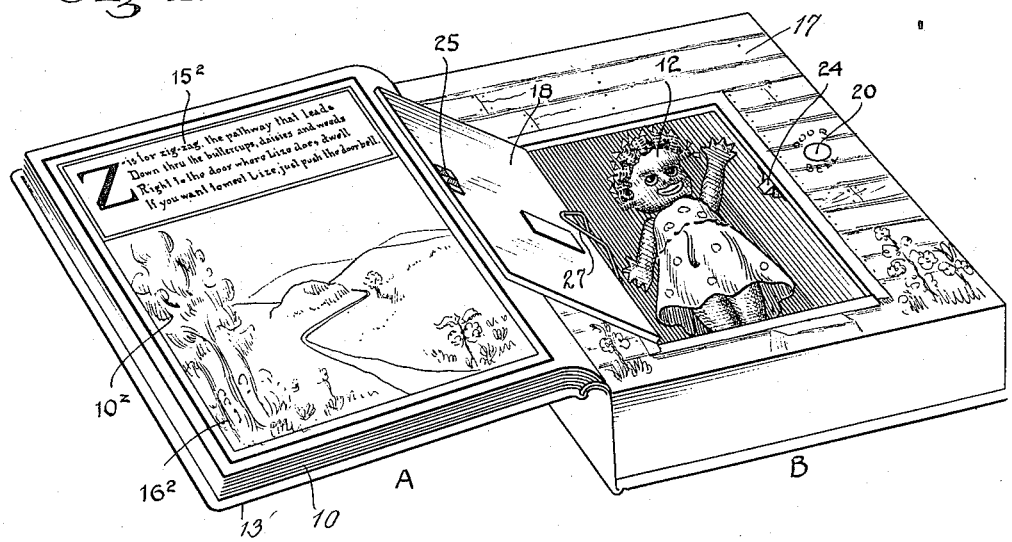

Patented Apr. 15, 1924.

1,490,295

UNITED STATES PATENT OFFICE.

HARRY S. STEPHENS, OF LOS ANGELES, CALIFORNIA.

AMUSEMENT BOOK.

Application filed December 7, 1922. Serial No. 605,443.

*To all whom it may concern:*

Be it known that I, HARRY S. STEPHENS, a citizen of the United States, and resident of Los Angeles, in the county of Los Angeles and State of California, have invented certain new and useful Improvements in Amusement Books, of which the following is a specification.

This invention relates to a toy or amusement book, and has special reference to the provision of a combined story book and toy for children.

A principal object of my present invention comprehends the provision of a book for children constructed to provide an interesting narrative combined with a toy for the child's instruction and amusement, in which the story is associated with the toy in such manner as to create an absorbing interest in the story, to render the story characters concrete and realistic to the child, with the story and toy designed to independently serve for purposes of entertainment.

In children's nursery books and primers, the story text is usually accompanied by pictorial illustrations depicting various phases of the story or narrative, and it is well known that these accompanying illustrations serve to stimulate and very often create the child's interest in the story itself and more generally in book reading.

These pictorial illustrations aid materially in facilitating the child's imagery of the story text, and help intensively in fixing the story facts in the memory of the child, visual imagery afforded by the pictures and audible imagery created by the reading of the text combining to afford instruction through the channels of play. A principal desideratum of my present invention resides in the provision of a book in which this interest-producing association of visual and audible imagery in book reading is rendered more intimate by the combining with the story text of a toy representing a character or object forming part of the subject-matter of the story, such for example as the central figure of the narrative, the play toy serving to make the story characters concrete and realistic, and therefore to intensify and quicken the child's understanding of and attraction for book stories.

A further and coordinate object of my present invention contemplates a book construction in which the story is so associated with the toy as to serve to gradually arouse the child's curiosity in the central character of the story, and then to surprise the child with the presence of the toy representing said character, the toy being normally concealed from view and the story descriptively moving to a revelation of the toy as a climax.

A still further and related object of the invention includes the provision of a toy book provided with a story telling part and a toy containing part, each independently being capable of affording amusement for the child, and both combining to produce an amusement device for the child's absorbing entertainment.

The principal objects of my present invention may be said to include, besides the provision of a toy book having the characteristics above referred to; the further provision of a book provided with a story telling section and a toy holding section, the whole simulating an ordinary volume; the further provision of a toy book in which the toy holding section comprises a closed compartment normally concealing the toy from view and openable for revealing the same; the further provision of a toy book in which the story telling section itself combines text and pictorial illustrations centering about a given character or object, the story gradually leading up to the presence in the closed compartment of the objective representation of the story character; the still further provision of a toy book of this nature in which the child is called upon to actuate a device active for opening the toy holding compartment with the act of actuating the device being non-suggestive of the act of opening the compartment, so that the toy is revealed to the surprise of the child; and the general provision of a toy book in which the parts are interrelated in a highly pleasing manner for the combined edification and entertainment of children.

To the accomplishment of the foregoing and such other objects as may hereinafter appear, my invention consists in the elements and their relation one to the other, as hereinafter particularly described and sought to be defined in the claims, reference being had to the accompanying drawings showing a preferred embodiment of my invention, and in which:

Fig. 3 is a perspective view of the same showing the association of the last page of the story telling section and the toy holding section, and Fig. 4 is a perspective view of the same with the toy holding section opened for revealing the toy therein.

Referring now more in detail to the drawings, my invention relates to the provision of a toy book comprising a story telling section A and a toy holding section B defining the composite volume C, the story telling section including one or more pages 10 containing a narrative, and the toy holding section including a compartment 11 containing a toy 12, the compartment 11 compositely simulating a plurality of book pages which is suitably bound to the pages 10 between the book covers 13 and 14.

As heretofore mentioned, it is an object of the present invention to so associate the story telling section A and the toy holding section B of my book that an absorbing interest in the story is created, with the principal character or objective of the story presented in a realistic fashion to the child, and to this end the pages 10 of the story telling section A contain a narrative centering about some principal character or objective, the said character being objectively represented by the toy such as the figure toy 12 contained in the toy holding section B.

Figure 1:
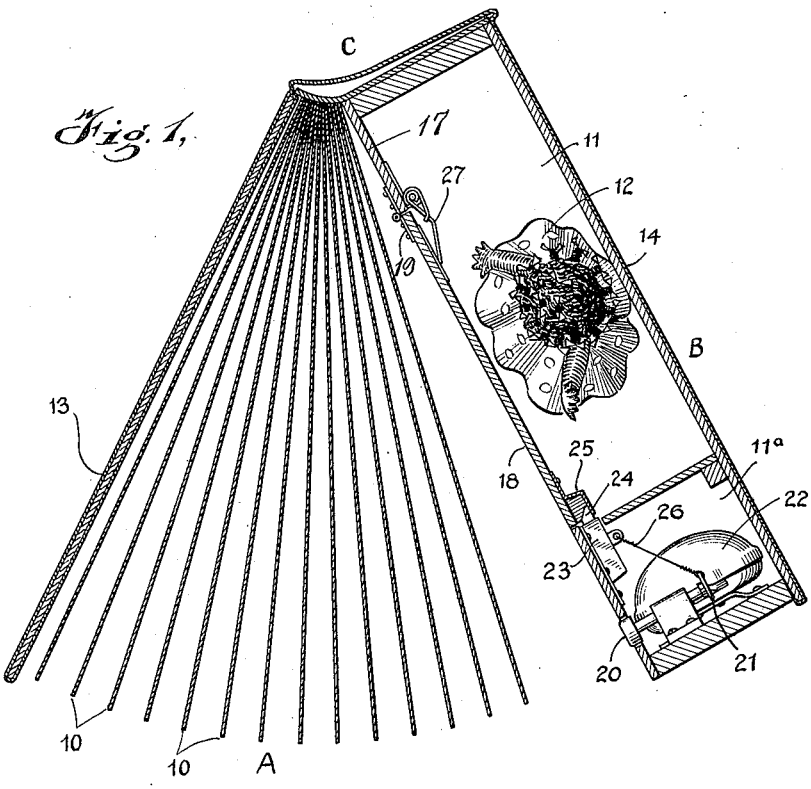
Fig. 1 is a cross-sectional view of the toy book.
Figure 2:
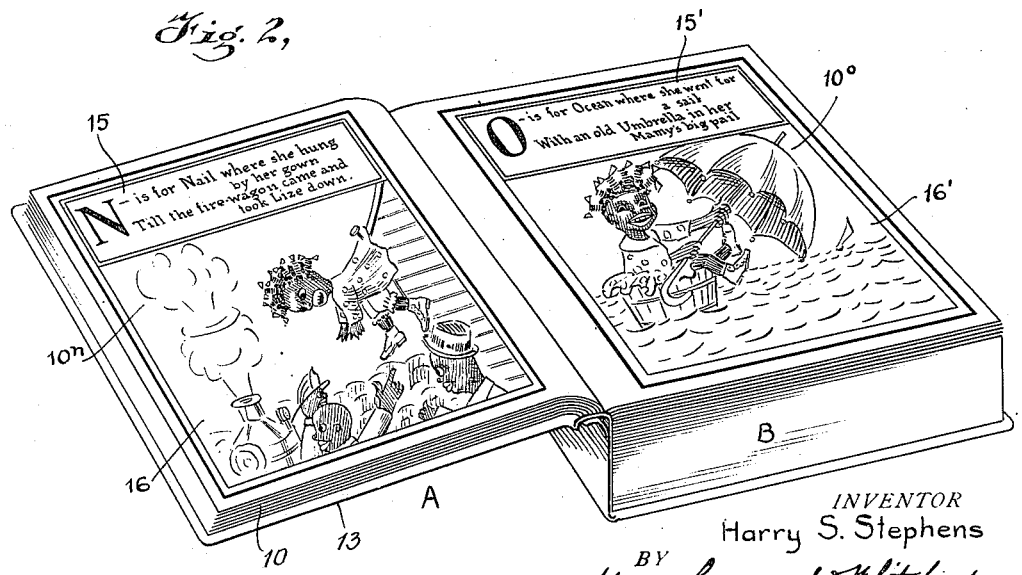
Fig. 2 is a perspective view of the toy book.

This corelation between the narrative and the toy may obviously be carried out in numerous ways centering about numerous subjects, and is illustratively portrayed in the embodiment shown in the drawings, wherein the story is shown to center about a darky character known to the reader and hearer as "Lize," the pages 10 serially depicting the persons and events important in the life of "Lize" such as her parents, friends, home environment, and various interesting happenings in her existence, this darky character being represented by the figure toy 12. The manner of portraying the life of "Lize" is shown for example in the two adjacent pages $10^n$ and $10^o$ of the book as shown in Fig. 2 of the drawings, page $10^n$ being subdivided into a text bearing portion 15 and a picture bearing portion 16 showing "Lize" hanging by a nail with firemen coming to her rescue, page $10^o$ being similarly subdivided into a text bearing portion 15' and a picture bearing portion 16' revealing how "Lize" went into the ocean for a sail with an old umbrella in her mammy's big pail.

As heretofore mentioned, the book construction of my present invention is designed, and the story thereof described, so as to gradually arouse the child's interest and curiosity in the central figure of the story, and then to surprise the child with the presence of the toy figure contained in the toy holding section of the book; and to this end the toy is normally concealed from view and the story is described so as to move to the revelation of the toy as a climax. To accomplish this, the compartment 11 is a normally closed compartment provided with an inner wall 17 facing the pages of the story telling section A, the said inner wall including a closure element such as a door 18 normally closed but movable on hinges 19 to an open position for revealing the concealed toy, this door when the book is closed being hidden from view and being exposed only when the last page of the story telling section is reached. The story or narrative gradually leads up to the material presence of "Lize" in the toy holding section B, and to this end the last page of the story telling section A, as shown in Figs. 3 and 4 of the drawings, may have reference and direct attention to the toy holding section, the said last page such as the page $10^z$ being subdivided in a manner similar to the other pages into a text bearing portion $15^2$ and a picture bearing portion $16^2$ showing the pathway "that leads down thru the buttercups, daisies and weeds right to the door where Lize does dwell."

For opening the door 18, I preferably provide a device which is manipulable by the child, and to which device the story directs attention, the said device preferably having a configuration and construction not directly but preferably remotely suggestive of the act of door opening, all to the end of finally revealing the toy to the surprise and amusement of the child. For this purpose the compartment wall 17 is provided with a push button device 20 comprising a door bell button, operation of which is designed to sound a bell and to effect the surprise opening of the door 18. The text $15^2$ of the last page $10^z$ preferably calls attention to the bell push button, with the instruction that "If you want to meet Lize just push the door bell." When the last page is reached and the story finished, with the exposing of the door and push button device the bell button is actuated for operating a ringing mechanism 21, effecting the ringing of a bell 22 located in a compartment $11^a$ and for opening a latch means 23 attached to the compartment wall 17, the latch 24 of which, normally in the keeper 25, which latter is attached to the door 18, being moved to open position by means of the draw string 26 attached to the mechanism 21. Upon opening the latch means, the door 18 is spring actuated to open position, a spring 27 active on the door for opening the same being provided to this end, the opening of the door as clearly shown in Fig. 4 of the drawings revealing the presence of the objective representation of "Lize." The figure toy representing the story character may then be removed from the compartment for purposes of play. When replaced in the compartment, the movement of the door 18 to closed position will cause self-latching of the same and the return of the parts to normal condition.

The manner of making and using my toy book will in the main be fully apparent from the above detailed description thereof. The toy book normally has the appearance of the ordinary volume, the compartment 11 and the pages 10 compositely simulating the pages of a book. The story telling section A may itself serve to tell an interesting narrative, the interest in the story and its character or characters being heightened by the revelation of the toy representing the central character of the narrative. After the story is told, the toy and its compartment may be employed as a means for creating entertainment, after which the toy may be removed for purposes of play. The compartment containing the toy furthermore may serve to house the same for purposes of safe-keeping, a protective container being thus provided therefor. By the provision of my invention, it will moreover be seen that I have provided a toy book in which the story characters are made concrete and realistic for intensifying the child's interest in book stories.

It will be understood that although I have shown my invention centering about a particular object or character, that numerous changes may be made for permitting the narrating of numerous other stories. For example, the story may be made to center about such characters as Rip Van Winkle or a member of his immediate family, the compartment containing the toy characterizing Rip Van Winkle or any close relative selected. As a further example, the narrative may be the story of a dog, and the toy may comprise a dog figure housed in the toy holding section. Other and numerous examples may be cited, and it will therefore be understood that while I have shown my device in the preferred form, that many changes and modifications may be made in the structure disclosed and in the specific cooperation of the parts without departing from the spirit of the invention defined in the following claims.

I claim:

1. A toy book comprising a story telling section including one or more pages containing a story centering about a given character or objective, and a toy holding section including a normally closed and openable compartment defining a housing and a toy representing the said character or objective housed by and normally concealed within the compartment and exposable to view upon opening the compartment.

2. A toy book comprising a story telling section including one or more pages containing a story centering about a given character or objective, and a toy holding section including a normally closed and openable compartment and a removable figure toy representing the said character or objective housed by and normally concealed within the compartment and removable upon opening the compartment.

3. A toy book comprising a story telling section and a toy holding section, the said toy holding section including a normally closed and openable compartment defining a housing, and a figure toy associated with the story of the story telling section housed by and normally concealed within the same and exposable to view upon opening the compartment.

4. A toy book comprising a story telling section including one or more pages containing a story centering about a given character or objective, and a toy holding section including a compartment provided with a wall facing the story telling section covered thereby when the book is closed and uncovered when the book is opened, a toy representing the said character or objective housed by and normally concealed within the compartment, and a closure element in said compartment wall openable for exposing the said toy to view.

5. A toy book comprising a story telling section and a toy holding section, the toy holding section including a compartment and a figure toy associated with the story of the story telling section housed by and normally concealed within the compartment, the said compartment being provided with an inner wall facing the story telling section covered thereby when the book is closed and uncovered when the book is opened, and a closure element in said compartment wall openable for exposing the figure toy to view.

6. A toy book comprising a story telling section including one or more pages containing a story centering about a given character or objective, and a toy holding section including a normally closed and openable compartment and a toy representing the character or objective in said compartment, the said compartment being provided with an inner wall and a closure in said wall facing the story telling section and normally covered by the last page thereof and uncovered when the last page of the story is reached, the said last page bearing a story part having reference to the presence of the toy within the compartment.

7. A toy book comprising a story telling section including one or more pages containing a story, and a toy holding section including a normally closed compartment, a toy housed by and normally concealed within the compartment, a closure element for the compartment, and a manually manipulable device active when manipulated for causing the closure to open to reveal the toy, the said device having a construction or configuration not directly suggestive of the act of closure opening.

8. A toy book comprising a story telling section including one or more pages containing a story centering about a given character or objective, and a toy holding section including a normally closed compartment and a toy representing the said character or objective housed by and normally concealed within the compartment, the said compartment being provided with an inner wall facing the story telling section normally covered by the last page of the story telling section and uncovered when the last page is reached, the said wall being provided with a door and a manually manipulable device active when manipulated for effecting the opening of the door to reveal the toy therein, the said device having a construction or configuration not directly suggestive of the act of door opening, and the said last page of the story telling section bearing a story part having reference to the presence of the toy within the compartment and calling attention to the said device.

9. A toy book comprising a story telling section including one or more pages containing the story, and a toy holding section including a normally closed compartment, a figure toy therein, a spring actuated door for said compartment, latch means for normally holding the door closed, and a manually manipulable device for said compartment effective when manipulated for unlatching said latch means to permit the door to be actuated to open position for revealing the toy in the compartment.

10. A toy book comprising a story telling section including one or more pages containing the story, and a toy holding section including a normally closed compartment, a figure toy within the said compartment, a wall of the said compartment being provided with a spring actuated closure element, latch means for normally holding the closure closed, a sounding device within the compartment, a manually manipulable device on the compartment wall adjacent the closure element active when manipulated for sounding the said sounding device and for unlatching the latch means to permit the door to be spring actuated to open position for exposing the toy therein to view.

11. A toy book comprising a story telling section including one or more pages containing a story centering about a given character or objective, and a toy holding section including a normally closed compartment, a figure toy representing the said character or objective within the said compartment, a wall of the said compartment being provided with a spring actuated closure element, latch means for normally holding the closure closed, a sounding device within the compartment, a manually manipulable device on the compartment wall adjacent the closure element active when manipulated for sounding the said sounding device and for unlatching the latch means to permit the door to be spring actuated to open position for exposing the toy therein to view.

Signed at Los Angeles, in the county of Los Angeles and State of California, this 28th day of November, A. D. 1922.

HARRY S. STEPHENS.